(12) United States Patent
Schroeder (10) Patent No.: US 7,380,259 B1
(45) Date of Patent: May 27, 2008

(54) SYSTEM AND METHOD FOR INTEGRATING WEATHER DATA INTO TELEVISION BROADCASTS

(75) Inventor: Jeffrey C. Schroeder, Gulf Breeze, FL (US)

(73) Assignee: Unisys Corporation, Blue Bell, PA (US)

( * ) Notice: Subject to any disclaimer, the term of this patent is extended or adjusted under 35 U.S.C. 154(b) by 1768 days.

(21) Appl. No.: 09/604,824

(22) Filed: Jun. 27, 2000

Related U.S. Application Data (60) Provisional application No. 60/197,704, filed on Apr. 18, 2000.

(51) Int. Cl.
*H04N 7/10* (2006.01)
*G01W 1/00* (2006.01)
*G06F 17/00* (2006.01)
*G09G 5/10* (2006.01)

(52) U.S. Cl. .......... 725/35; 725/36; 348/722; 345/418; 345/619; 702/3

(58) Field of Classification Search .......... 702/3; 348/563, 564; 725/32–33, 114, 119, 138, 725/144, 35
See application file for complete search history.

(56) References Cited

U.S. PATENT DOCUMENTS

| | | | | |
|---|---|---|---|---|
| 3,752,919 | A * | 8/1973 | Qurashi et al. | 348/343 |
| 4,428,043 | A * | 1/1984 | Catiller et al. | 709/250 |
| 4,701,845 | A * | 10/1987 | Andreasen et al. | 714/31 |
| 5,117,359 | A * | 5/1992 | Eccles | 702/3 |
| 5,454,265 | A | 10/1995 | Rentzsch et al. | 73/170.04 |
| 5,568,385 | A * | 10/1996 | Shelton | 702/3 |
| 5,616,860 | A | 4/1997 | Morohoshi et al. | 73/170.14 |
| 5,797,809 | A | 8/1998 | Hyuga | 473/407 |
| 5,848,378 | A * | 12/1998 | Shelton et al. | 702/3 |
| 5,918,276 | A | 6/1999 | Grindle et al. | 73/170.11 |
| 5,940,776 | A * | 8/1999 | Baron et al. | 702/4 |
| 5,943,630 | A * | 8/1999 | Busby et al. | 702/3 |
| 5,982,456 | A * | 11/1999 | Smith et al. | 348/722 |
| 6,018,699 | A | 1/2000 | Baron, Sr. et al. | |
| 6,031,579 | A * | 2/2000 | Stephenson | 348/564 |
| 6,240,369 | B1 | 5/2001 | Foust | |
| 6,275,774 | B1 * | 8/2001 | Baron et al. | 702/3 |
| 6,343,255 | B1 * | 1/2002 | Peek et al. | 702/3 |
| 2002/0141491 | A1 | 10/2002 | Corts et al. | |

OTHER PUBLICATIONS

Inscriber Technology Web Site (www.inscriber.com), Products, RTX Automation, Mar. 9, 2000.

Videotex (www.videosystems.com), Matrox DigiMix Products, Mar. 9, 2000.

(Continued)

*Primary Examiner*—Antony Nguyen-Ba
(74) *Attorney, Agent, or Firm*—Richard J. Gregson; Robert P. Marley; Gary M. Cohen

(57) ABSTRACT

A system and method are provided for integrating data representing at least one weather parameter prevailing at at least a first geographic location into a television broadcast related to the first geographic location. An icon signal representing a weather parameter icon is generated in response to the weather parameter, and represents the weather parameter sensed at the first geographic location. Apparatus is provided for receiving the television broadcast related to the first geographic location, and for merging the television broadcast signal with the icon signal, producing an output television signal representing the weather parameter icon superimposed on the television broadcast.

55 Claims, 9 Drawing Sheets

OTHER PUBLICATIONS

Davis (www.davisnet.com), Weather Wizard III®, May 22, 2000.
Davis (www.davisnet.com), Wireless Weather Wizard III® with AC Power, May 22, 2000.

Nicholson, Leslie J., Golf Tournament Viewers Get Real-Time Reports On Wind Speed and Direction, The Inquirer, May 18, 2000, Philadelphia, Pennsylvania.

* cited by examiner

SYSTEM AND METHOD FOR INTEGRATING WEATHER DATA INTO TELEVISION BROADCASTS

CROSS-REFERENCE TO RELATED APPLICATIONS

The present application claims the benefit of provisional application No. 60/197,704, filed Apr. 18, 2000. The content of aforementioned application is fully incorporated by reference.

BACKGROUND

Television broadcast networks that cover sporting events are continually searching for ways to convey more information to the sports viewer. With ongoing advances in computer hardware and software technology, more information related to the sporting event can be sent to the viewer than ever before. When televising sports such as baseball, football, golf, and others, the weather conditions prevailing at the sporting venue can bear significantly on the outcome of the sporting event, so the home viewer will be interested in those weather conditions. For example, is the wind blowing in or out of left field at Wrigley Field when Sammy Sosa comes to bat in the ninth inning, or is the wind swirling instead so that it is coming in from right field, but going out from left field? On a cold windy December day in Buffalo, when one of the teams is driving to attempt the winning field goal, is the wind in their faces or at their backs, and how will that effect the kicker? At the British Open golf tournament, what are the wind conditions at the $9^{th}$ hole, and what are the wind conditions at the $18^{th}$?

There is a pressing need in the art for a system and method for integrating weather data into television broadcasts, especially for sporting events such as those examples outlined above. With such systems and methods, the television viewer can immediately see the prevailing weather conditions at a glance, without relying on the commentators to pass that information along at their leisure.

SUMMARY

The invention provides a system for integrating data representing at least one weather parameter prevailing at at least a first geographic location into a television broadcast related to the first geographic location. The system comprises at least one monitoring station located at the first geographic location, with the monitoring station including a means for sensing the weather parameter. The sensing means is adapted to generate a weather parameter signal representing the weather parameter. The monitoring station also includes a means for transmitting the weather parameter signal from the monitoring station.

The system also comprises a base station that further includes a means for receiving the weather parameter signal from the monitoring station. This receiving means provides the weather parameter signal to the rest of the base station. Means, coupled to receive the weather parameter signal from the receiving means, are provided for generating an icon signal representing a weather parameter icon in response to the weather parameter signal. The weather parameter icon represents the weather parameter sensed at the first geographic location. Means are provided for receiving an input television signal representing the television broadcast related to the first geographic location. These receiving means provide the input television signal to the base station. Finally, means are provided for merging the input television signal with the icon signal, with the merging means producing an output television signal representing the weather parameter icon superimposed on the input television signal.

DETAILED DESCRIPTIONS OF ILLUSTRATIVE EMBODIMENTS

Figure 1:
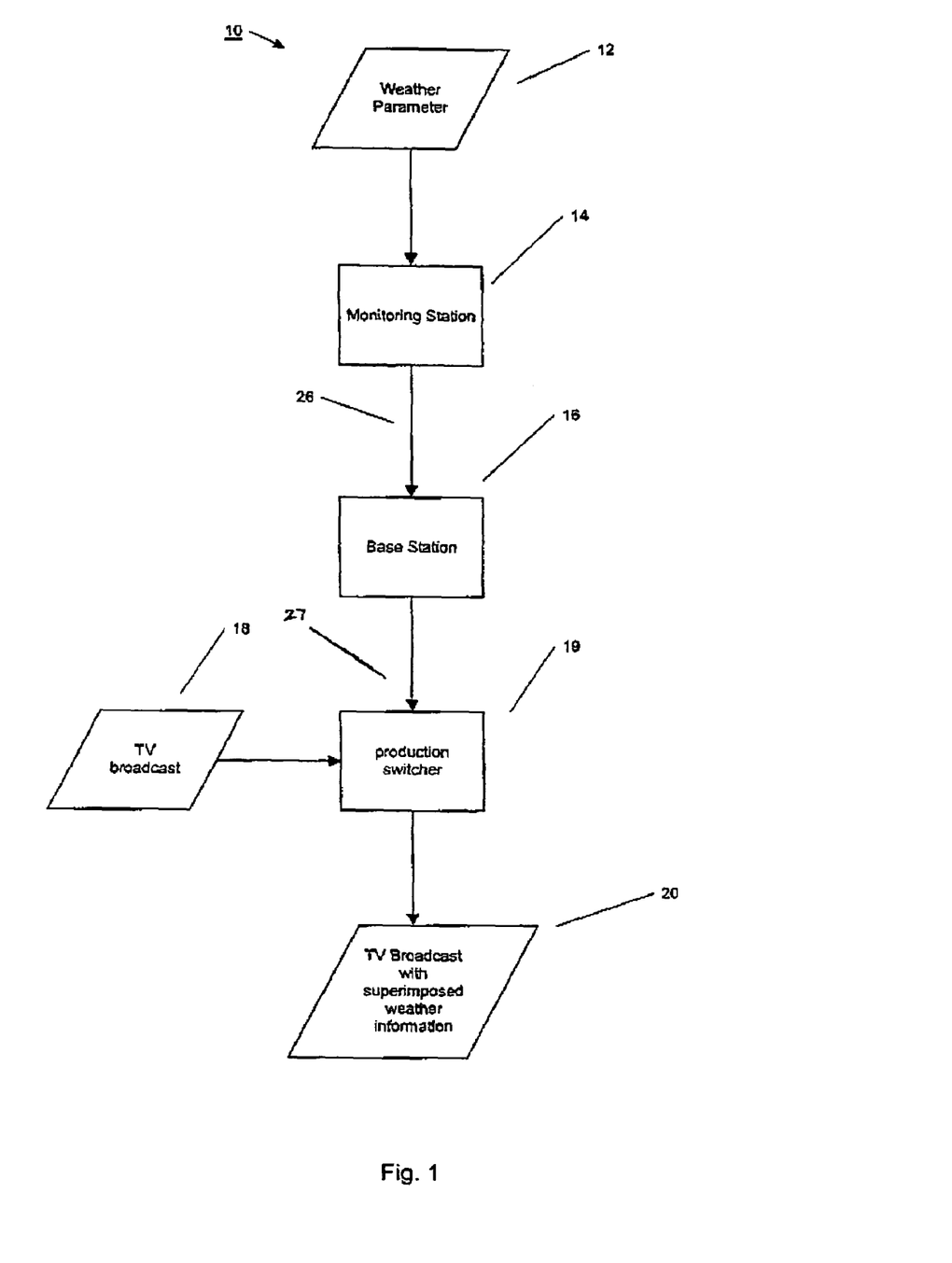
FIG. 1 is a top-level diagram of an illustrative embodiment of the invention shown in an illustrative operating environment.

FIG. 1 is a top-level diagram of an illustrative embodiment of the invention shown in an exemplary operating environment. The invention provides a system 10 for integrating data representing at least one weather parameter 12 prevailing at at least a first geographic location into a television broadcast related to the first geographic location. The system comprises at least one monitoring station 14 located at the first geographic location, with a base station 16 located at a central location, such as in or near the "truck" that the television network uses to coordinate its broadcasting activities at a given sporting venue. For example, if a television network is covering a golf tournament, it might place cameras and announcers at each hole of the course, so the network could also place a monitoring station 14 constructed in accordance with the invention at one, several, or all of the holes in the course. As another example, a television network covering a baseball game might place cameras at various locations around the stadium, and the network might similarly place a monitoring station 14 at various locations, such as along the outfield wall. Each of these locations could be a "geographic location" in the context of this description.

The base station 16 receives as input weather parameter signals on link 26 from the monitoring station 14 and generates signals on link 27 representing a graphic icon corresponding to the signals received on link 26. In an illustrative embodiment, the base station 16 is implemented as a general purpose personal computer programmed with special-purpose software as described in further detail below. A production switcher 19, known in the art, operates to merge the graphic icon signals on link 27 with an input TV broadcast 18 to produce a TV broadcast 20 with the graphic icon signals superimposed on the television broadcast.

Figure 2:
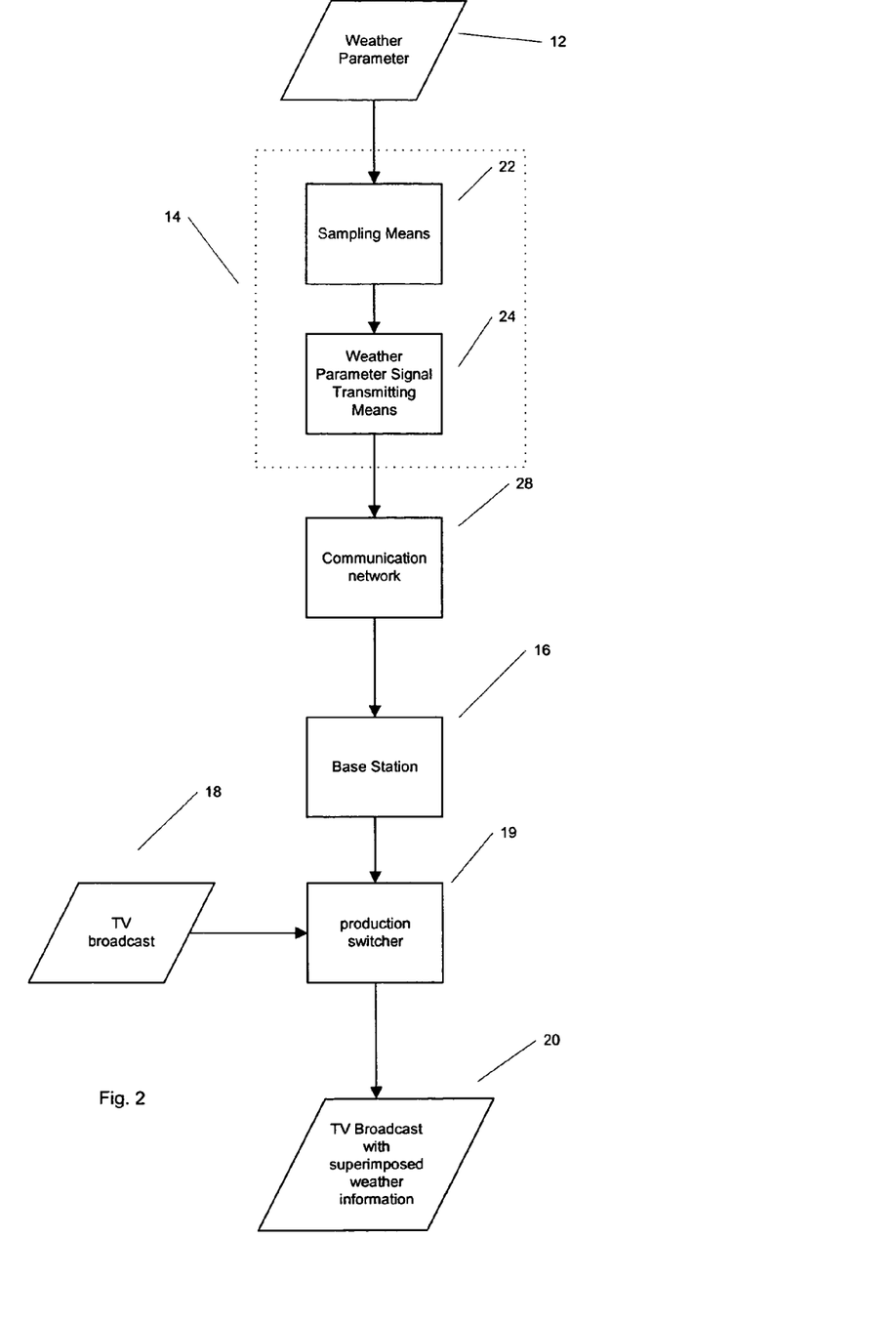
FIG. 2 is a block diagram of a monitoring station constructed in accordance with an illustrative embodiment of the invention as shown in FIG. 1.

FIG. 2 is a block diagram of the monitoring station 14 as shown in FIG. 1. The monitoring station 14 includes a means 22 for sensing or sampling a given weather parameter 12 and for generating a weather parameter signal corresponding to the sampled weather parameter. The monitoring station 14 also includes a means 24 for transmitting the weather parameter signal from the monitoring station 14. Typically, this transmitting means 24 transforms the signal as necessary to make it suitable for transmission over distances. However, the specific means chosen for the transmitting means 24 will depend on the choice of transmission medium chosen to link the base station 16 with the one or more monitoring stations 14.

In an illustrative embodiment of the invention, a communications network 28 serves as the link 26 shown in FIG. 1, and couples the transmitting means 24 of the monitoring station with the base station 16. The communications network 28 can be a cellular communications network, in which case the transmitting means 24 would be a suitable cellular modem. Alternatively, the communications network 28 can be another wireless embodiment such as a UHF radio or other RF communications network, in which case the transmitting means 24 would be a modem suitable for interfacing the monitoring station 14 with such network 28. However, if the monitoring station 14 is sufficiently close to the base station 16, or if the monitoring station 14 is intended to maintain a permanent geographic position relative to the base station 16, then it can be direct-wired via link 26 to the base station 16, as illustrated in FIG. 1. In this case, communications network 28 would include all the conductors and connectors necessary to place the base station 16 and the monitoring station 14 in communication.

One key advantage of the wireless embodiment of system 10 is the mobility provided by the base station 16 and the monitoring station 14. In an illustrative embodiment, the monitoring station 14 is constructed of lightweight components (e.g., microcontroller, modem, etc.) attached to a lightweight metal staff suitable for driving into the ground. Such an embodiment is light enough to be carried manually, and is not tethered to the base station 16, owing to the wireless implementation of communication network 28. This mobility is especially useful, for example, for a television broadcast network covering sporting events: the network personnel can arrive at a sporting venue, set up the system 10 quickly, move the monitoring station 14 easily as necessary to cover the event, and break the system 10 down quickly to move on after the sporting event concludes.

Figure 3:
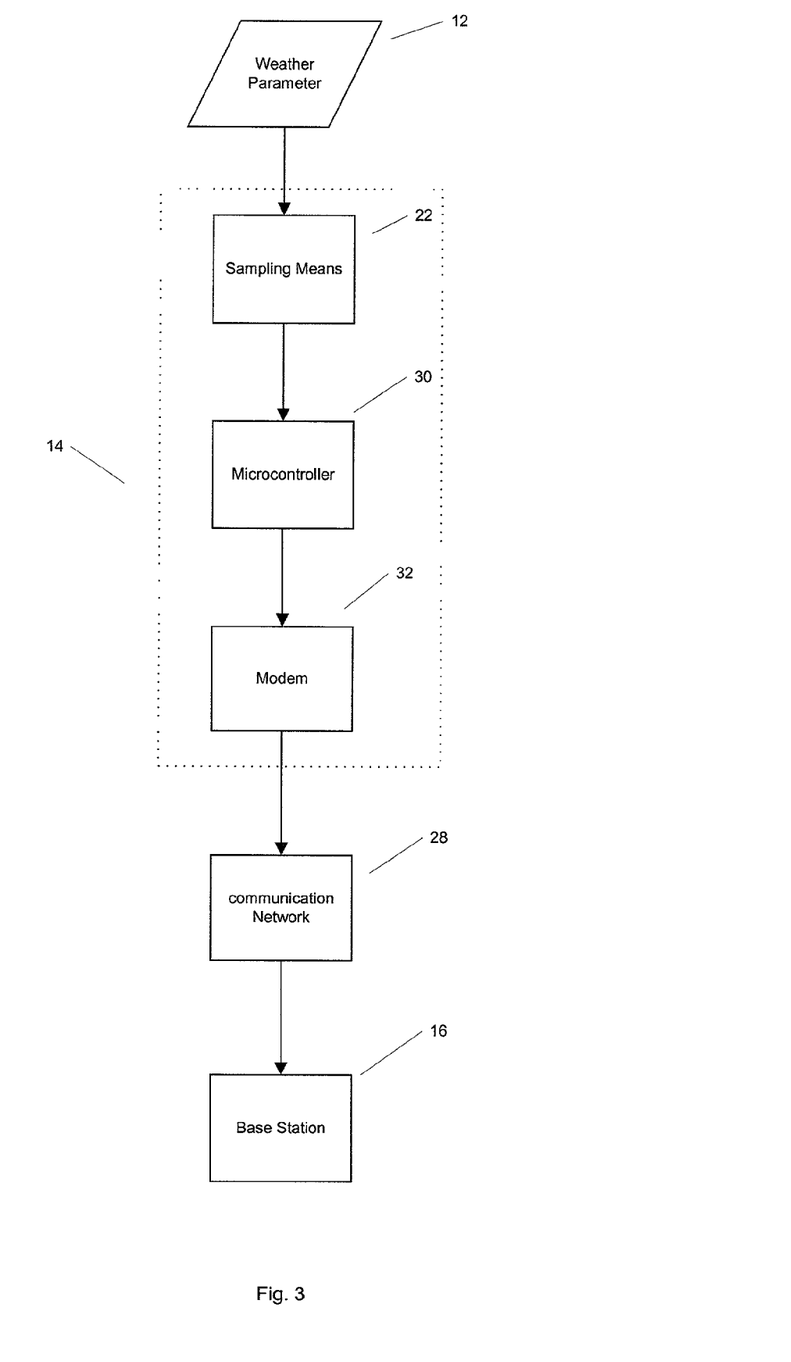
FIG. 3 is a more detailed block diagram of the monitoring station constructed in accordance with an illustrative embodiment of the invention, as shown in FIG. 2.

FIG. 3 is a more detailed block diagram of the monitoring station 14 constructed in accordance with an illustrative embodiment of the invention shown in FIG. 2. In an illustrative embodiment of the invention, the monitoring station 14 includes a microcontroller 30, such as an 80C552-based microcontroller as available from Tecel Company in Albuquerque, N. Mex. Microcontroller 30 is coupled to receive the weather parameter signal 12 from the sampling means 22, and the transmitting means 24 includes a modem 32 coupled to the microcontroller 30 to transmit the weather parameter signal 12 from the monitoring station. The microcontroller 30 can be adapted to provide a user interface (not shown) to the monitoring station 14 to allow the user to adjust the operating parameters of the monitoring station 14 as necessary (sampling intervals, etc.).

Figure 4:
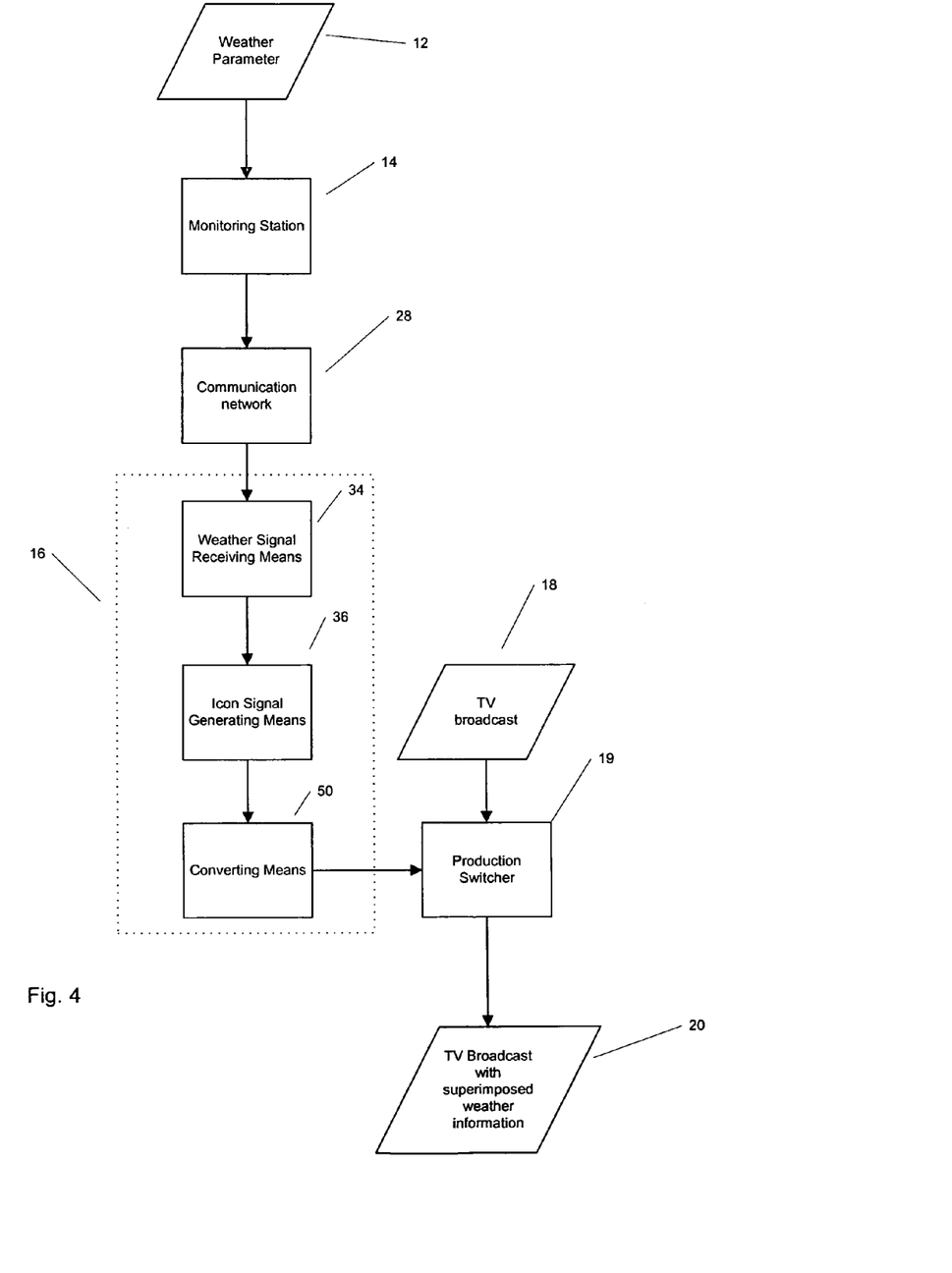
FIG. 4 is a block diagram of a base unit constructed in accordance with an illustrative embodiment of the invention as shown in FIG. 1.

FIG. 4 is a block diagram of a base station 16 constructed in accordance with an illustrative embodiment of the invention as shown in FIG. 1. The base station 16 includes a means 34 for receiving the weather parameter signal 12 from the monitoring station 14 via communications network 28 and providing the weather parameter signal 12 to the rest of the base station 16. Typically, this receiving means 34 transforms the received signal as necessary from its transmission format to make it suitable for processing by the rest of the base station 16. However, as above, the specific means chosen for the receiving means 34 will depend on the choice of communication network 28 chosen to link the base station 16 with the one or more monitoring stations 14.

Means 36, coupled to receive the weather parameter signal from the receiving means 34, are provided for generating an icon signal representing a weather parameter icon that varies in response to the value of the weather parameter signal 12. The weather parameter icon represents the weather parameter signal 12 sampled at the first geographic location in a format that a viewer could readily recognize and assimilate. As appreciated by those skilled in the art of graphic user interfaces, the generating means 36 can be implemented by software on a specially-programmed general purpose computer to generate appropriate icons for the weather parameter signal 12.

Means 50 are provided for converting the icon signal from the generating means 36 into a television signal representing the weather parameter 12. The television signal output from converting means 50 is in a format suitable for integration into the television broadcast 20 as ultimately produced and broadcast to the viewer. Converting means 50 is discussed in more detail in connection with FIG. 9 below.

Figure 5:
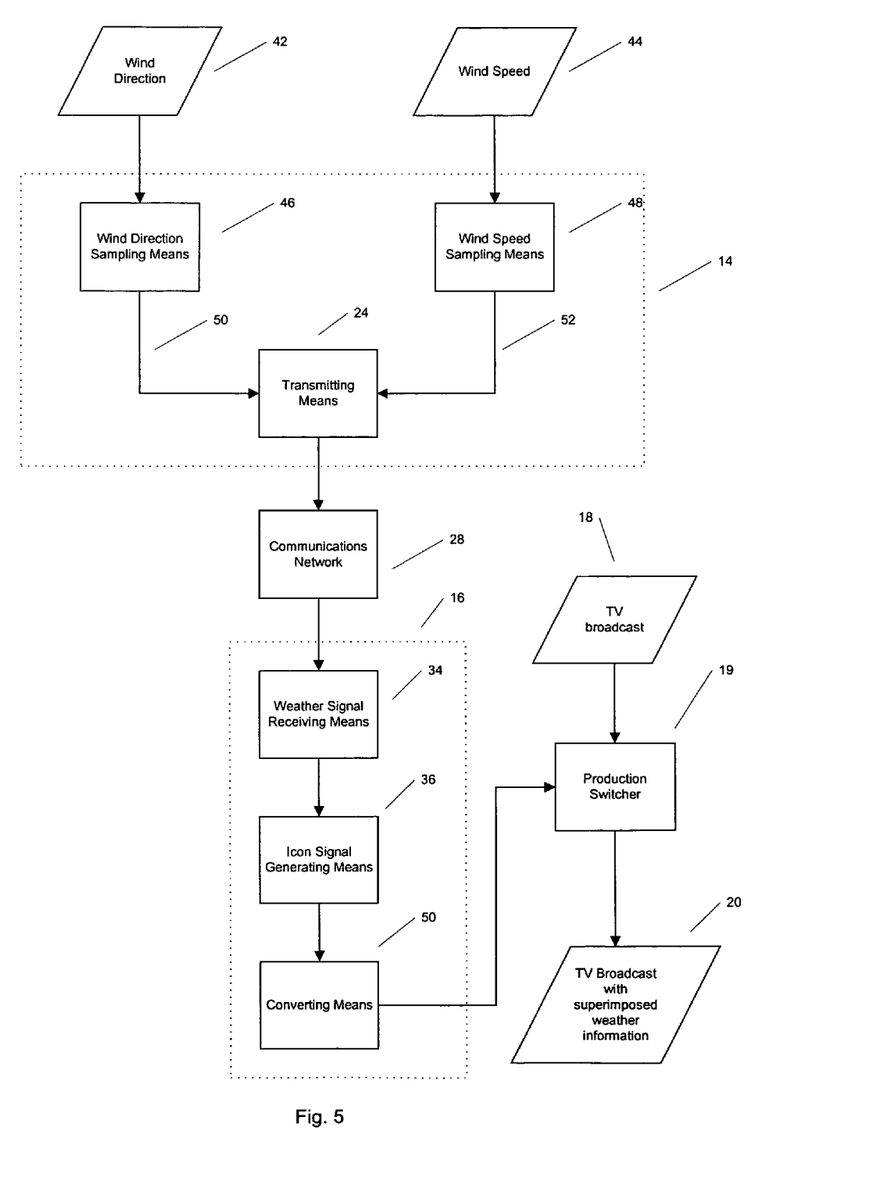
FIG. 5 is a block diagram of a monitoring station constructed in accordance with a further illustrative embodiment of the invention as shown in FIG. 1, wherein the monitoring station is adapted to sample wind direction and wind speed.

FIG. 5 is a block diagram of a monitoring station 14 constructed in accordance with a further illustrative embodiment of the invention as shown in FIG. 1, wherein the monitoring station 14 is adapted to sample illustrative weather parameters such as wind direction 42 and wind speed 44. In this embodiment, the transmitting means 24 are adapted to transmit respective signals representing the wind direction 42 and the wind speed 44 over communication network 28 to the base station 16. Those skilled in the art will recognize that this function can be realized by time-multiplexing both signals over a shared transmitting means 24 or by providing separate transmitting means dedicated to each signal. In this illustrative embodiment, the generating means 36 is responsive to the wind direction signal 42 to create a wind direction icon signal representing a wind direction icon, and is responsive to the wind speed signal 44 to create a wind speed icon signal representing a wind speed icon. For example, the generating means 36 can be adapted to create a wind direction icon signal representing a wind direction icon that has a directional orientation that varies in response to the wind direction signal 42, although other suitable icons may be appreciated by those skilled in the art. Similarly, the generating means 36 can be adapted to create a wind speed icon signal representing a wind speed icon having a physical characteristic that varies in response to the wind speed signal 44. For example, the wind speed icon could be a numerical readout, a bar graph, etc.

In an illustrative embodiment of the invention, the sampling means 22 in FIGS. 2 and 3 includes a means 46 for sensing a wind direction 42 prevailing at the first geographic location and for generating a wind direction signal on link 50 representing that prevailing wind direction. One device suitable for the wind direction sensing means 46 is a wind vane. Continuing the illustrative embodiment of the invention, the sampling means 22 includes a means 48 for sensing a wind speed prevailing at the first geographic location and for generating a wind speed signal on link 52 representing the wind speed 44. One device suitable for the wind speed sensing means 48 is an anemometer.

Returning to FIG. 4, production switcher 19 receives an input television signal 18 representing the television broadcast related to a first geographic location monitored by a first one of the monitoring stations 14. As known in the art, this input television signal 18 is typically captured by a television camera or other suitable camera positioned proximate the first geographic location. Production switcher 19 merges the input television signal 18 with the output signals representing the weather parameter icon(s) from the generating means 36. The production switcher 19 produces an output television signal 20 representing the weather parameter icon superimposed on the input television signal 18, resulting in a television broadcast 20 related to the first geographic location with the weather parameter icon appearing on the broadcast as perceived by the viewer.

In another illustrative embodiment, base station 16 and production switcher 19 can be adapted to merge an additional icon with the broadcast signal 18, such as an icon for an advertiser's logo or the like arranged to be on the viewing screen proximate the weather-related icons. Since the viewer's attention will be drawn to the weather-related icon(s), advertising space near icon(s) likely will sell at a premium. Signals representing the advertising or other icon can be merged into the output television signal 20 in the same manner as the signals representing the weather-related icons.

Figure 6:
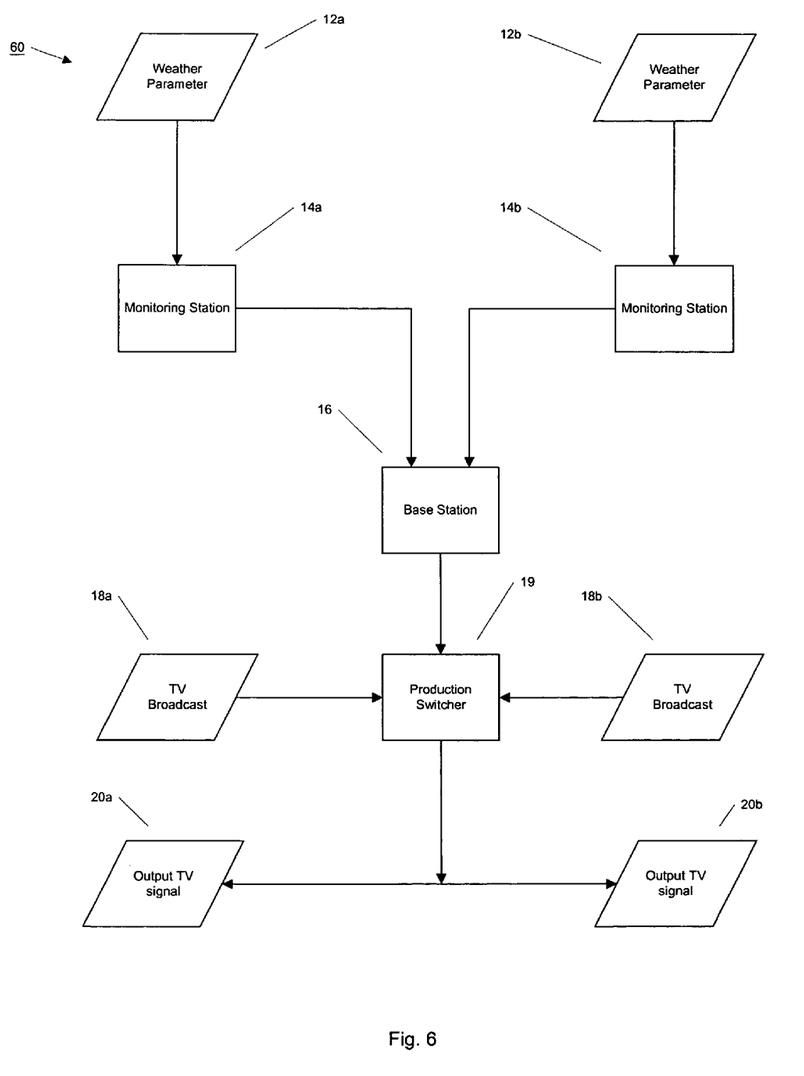
FIG. 6 is a block diagram of a system constructed in accordance with a further illustrative embodiment of the invention as shown in FIG. 1, wherein the system includes multiple monitoring stations deployed to sample weather parameters at a variety of geographic locations.

FIG. 6 is a block diagram of a system constructed in accordance with a further illustrative embodiment of the invention as shown in FIG. 1, wherein the system includes multiple monitoring stations deployed to sample weather parameters at a variety of geographic locations. As discussed above, the television broadcast network covering, for example, a sporting event might deploy a plurality of the monitoring stations as necessary to cover the sporting event. In this event, at least a second monitoring station is located at a second geographic location related to the broadcast. For example, the broadcast network might deploy a monitoring station at each hole of a golf course hosting a televised golf tournament. Any additional monitoring stations are substantially identical to the monitoring station 14 already disclosed above, and include similar elements.

Continuing with FIG. 6, the base station 16 is adapted to operate with the additional monitoring station 14b. Specifically, the means 34 (FIG. 5) for receiving the weather parameter signals 12a and 12b from the monitoring stations 14a and 14b is adapted as necessary to receive the additional weather parameter signal 12b from the additional monitoring station 14b. Those skilled in the art will recognize that this function can be realized by having the base station periodically poll each monitoring station 14a and 14b and receive the weather parameter signals 12a and 12b over a shared receiving means 34 in a time-multiplexed manner; alternatively, a separate receiving means 34 can be dedicated to each monitoring unit 14a and 14b. The means 36 for generating the signal representing the weather parameter icon is responsive to the additional weather parameter signal 12b to create an additional weather parameter icon signal representing an additional weather parameter icon representing the weather parameter prevailing at the additional geographic location. It should be understood that the embodiment illustrated in FIG. 6 can be readily adapted to sample not only weather parameters 12a and 12b generally, but also wind direction 42 and wind speed 44 specifically, as illustrated and discussed in connection with FIG. 5 above.

Television signals 18a and 18b are similar to signal 18 discussed above, but signals 18a and 18b are associated with separate geographic locations, such as different holes at a golf course. The production switcher 19 is adapted to receive the additional television broadcast signal 18b related to the additional geographic location, and is adapted to merge the additional television broadcast signal 18b with the additional weather parameter icon signals representing the weather parameter(s) 12b sampled by monitoring station 14b. Thus, the production switcher 19 is adapted to produce output signals 20a and 20b, with output signal 20a representing the weather parameter 12a superimposed on broadcast signal 18a, and output signal 20b representing the weather parameter 12b superimposed on broadcast signal 18b.

Figure 8:
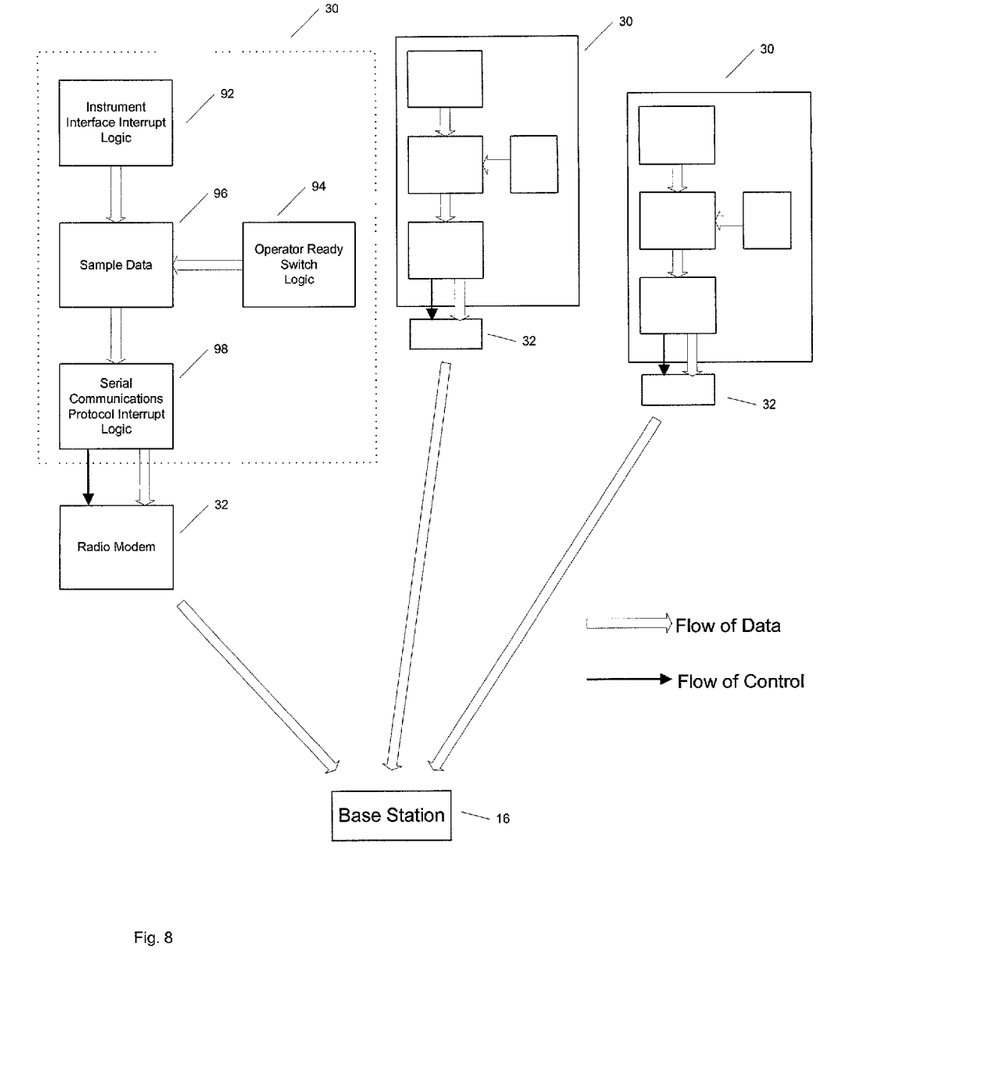
FIG. 8 is a block diagram of the various software components residing on the microcontroller provided as part of the remote monitoring unit constructed according to an illustrative embodiment of the invention.

FIG. 8 is a block diagram of the various software components residing on the microcontroller 30 of FIG. 3. The microcontroller 30 provides Instrument Interface Interrupt Logic 92 for servicing interrupts generated by the instruments provided as sampling means 22, such as wind vanes and anemometers. The software running on microcontroller 30 also provides appropriate Interrupt Service Routines (ISRs) to configure the sampling means 22 and to retrieve sampled data from sampling means 22, as recognized and understood by those skilled in the art. Operator Ready Switch Logic 94 allows the user to configure and program the microcontroller 30, such as to enter sampling parameters. Sample data block 96 serves to receive, store, buffer, and transmit data sampled by the sampling means 22, and is responsive to the programming entered by the user through the Operator Ready Switch Logic 94. The Serial Communications Protocol Interrupt Logic 98 functions to coordinate and execute the serial communication of the sampled data from the microcontroller 30 to the base station 16. Specifically, Serial Communications Protocol Interrupt Logic 98 services all interrupts involved with the serial communication between the microcontroller 30 and the base station 16. A radio modem embodiment 32 of transmitting means 24 is coupled to the microcontroller 30 to communicate serially with the base station 16. A suitable radio modem 32 is the TS4000 by Teledesign Systems. However, those skilled in the art will recognize that other radio modems are available and may be appropriate in certain applications.

Figure 9:
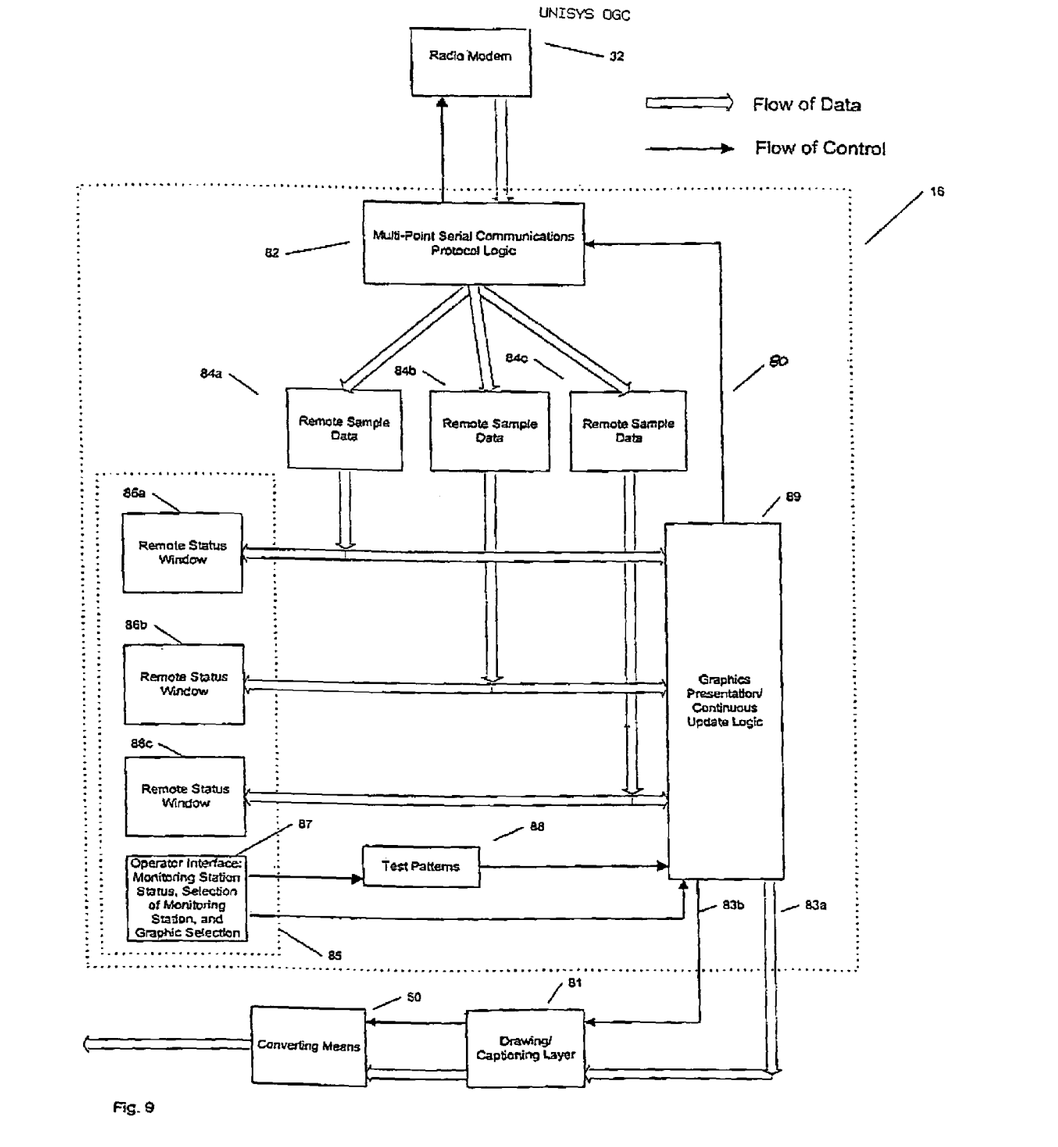
FIG. 9 is a block diagram of the software running aboard the base station.

FIG. 9 is a block diagram of the software running aboard the base station 16. At the base station 16, a radio modem embodiment 32 of receiving means 34 is coupled to communicate with the monitoring station 14 to communicate serially with the microcontroller 30. The radio modem 32 passes the transmitted data on to Multi-Point Serial Communications Protocol logic 82, which functions to coordinate and execute the serial communication between the base station 16 and each one of the microcontrollers 30 provided by the several monitoring stations 14. The Protocol logic 82 is based on a poll-select protocol developed by Burroughs that uses the following format: start-byte, address, sequence, command, data, and block-check. This Burroughs protocol is especially suitable because of its efficient use of the relatively limited bandwidth of the radio modems 32. Note that the radio modems 32 may also offer their own multi-point protocol, but these protocols may entail excessive overhead.

The Remote Sample Data areas 84a, 84b, and 84c are buffers for storing the data sampled by and received from respective ones of the monitoring stations 14. One Remote Sample Data area 84a, 84b, or 84c is provided for each monitoring station 14 provided by system 10.

The software running on the base station 16 also provides an Operator Interface block 85 that enables the user selectively to display the status of the various monitoring stations 14, to select a specific monitoring station 14 for sampling, and to select a graphic to be used to display the data from the selected monitoring station 14. The Operator interface block 85 provides at least one remote status window 86a, 86b, or 86c, one for each monitoring station 14 provided by system 10. Each remote status window 86a, 86b, or 86c displays to the user the operating status and/or the data sampled by the monitoring station 14 with which it is associated. The Operator interface subsection 87 allows the operator to set the graphic parameters that control where the icons representing the sampled data will be displayed (left corner, right corner, logo, no logo, distance numbers, etc.). The operator interface block 85 generates output control signals controlling which monitoring station 14 is to be sampled and displayed, and which graphics are to be used to display the data sampled from the selected monitoring station 14.

The Graphics Presentation/Continuous Update Logic 89 receives data signals from the Remote Sample Data areas 86a, 86b, and 86c, and receives control signals from the operator interface subsection 87. After selecting a monitoring station 14 and setting the graphic parameters as described above, the user activates an "execute" or similar button to cause the Graphics Presentation/Continuous Update Logic 89 to combine the operator input with the sampled data from the selected monitoring station 14. The Graphics Presentation portion of the logic then generates a display of the resulting graphic. The Continuous Update portion of the logic generates control signals 81 to the Multi-Point Serial Communications Protocol logic 82 to re-sample or refresh the data sampled from the monitoring station 14 as necessary to provide the viewer with an up-to-the-minute display of weather or wind conditions, in near-real-time. The Graphics Presentation/Continuous Update Logic 89 provides output data signals 83a to a converting means 50, such as a graphic frame buffer card, and generates control signals 83b to the converting means 50, in addition to the control signals 81 to the Multi-Point Serial Communications Protocol logic 82.

The test patterns module 88 is responsive to control signals from the operator interface block 85 to generate test signals that are passed as control signals to the Graphics Presentation/Continuous Update Logic 89. Such test signals can be useful for debugging or diagnosing problems with the system 10, as recognized by those skilled in the art.

The graphic frame buffer card, serving as converting means 50, receives both data and control signals from the Graphics Presentation/Continuous Update Logic 89. A suitable card and driver software are available from Matrox, Inc., such as their "DigiMix" model. However, other graphics cards may be available and may be suitable in certain applications.

In an illustrative embodiment of the invention, an additional drawing/captioning language layer 81 resides between the software on the base station 16 and the graphics card 50 that enables the software to specify abstract graphics parameters rather than requiring the software to manipulate pixels directly to effect the desired graphics. For example, using such a drawing/captioning language layer 81 would enable the software to specify "put '2.5 MPH' in the 'Banker' font with anti-aliasing at coordinate (85,421)" instead of having to perform pixel by pixel manipulations. Suitable drawing/captioning software 81 is the RTX product available from Inscriber Technologies. RTX provides a type of character generator utility that interprets a drawing/captioning command language into pixels on a memory bitmap. However, other similar software packages may be available and may be suitable in certain applications to implement drawing/captioning language layer 81. In certain applications, it may be desirable to forego implementation of drawing/captioning language layer 81 in favor of direct pixel manipulation.

From this pixels-in-memory bitmap, the frame buffer card 50 generates NTSC (in North America and Japan; otherwise PAL) standard video and key, synchronized to a common sync signal. The frame buffer card 50 converts pixels stored in memory into a standard video synchronized waveform, and provides this waveform as output. This waveform output is routed to the production switcher 19 in the main control room, which superimposes the waveform output over the TV broadcast signal at the command of the director. The production switcher 19 also switches between camera shots, fades to black, etc. The production switcher 19 is known in the art and the system 10 constructed according to the invention generates input to the production switcher 19.

METHOD OF OPERATION

Figure 7:
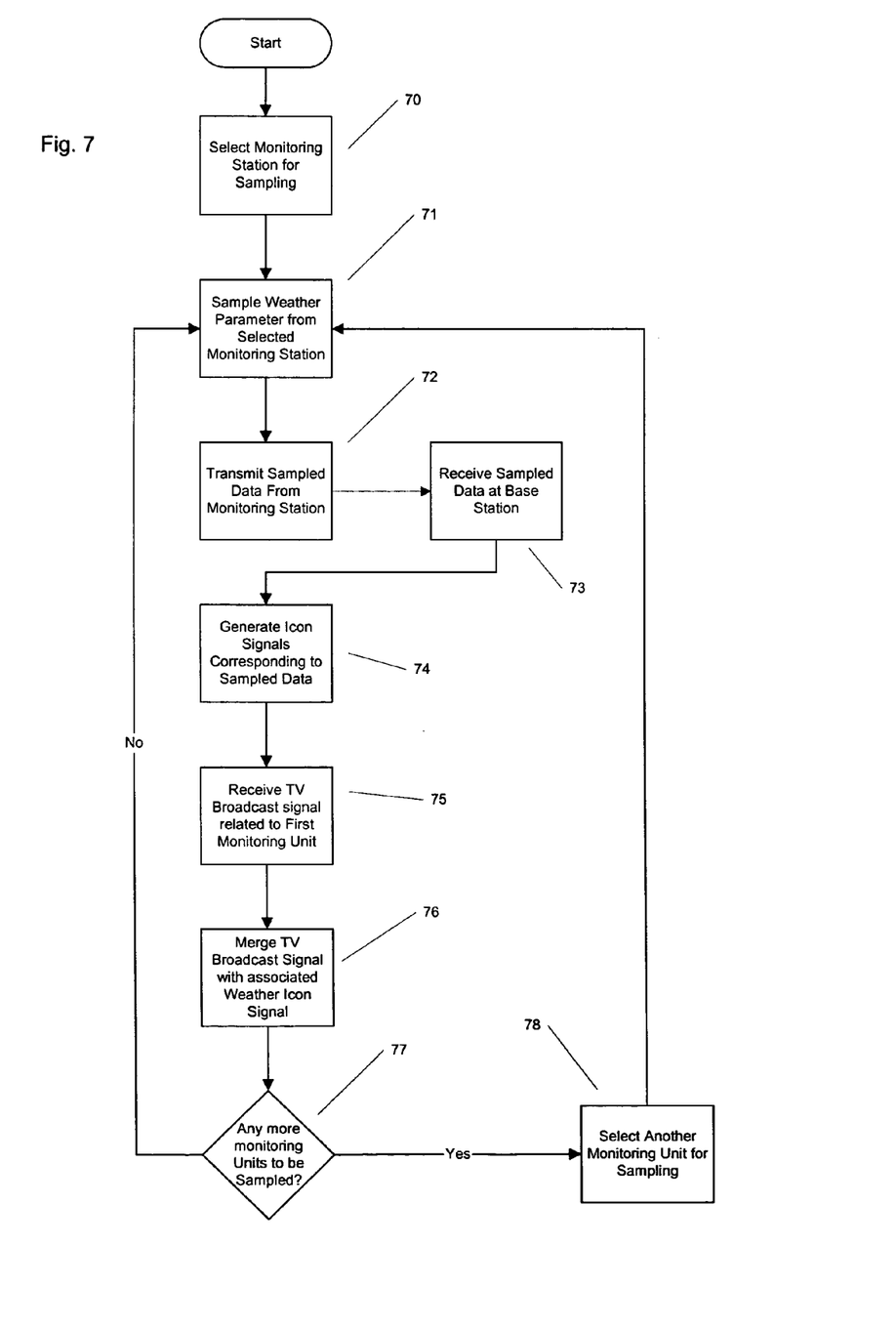
FIG. 7 is a flowchart diagram of an illustrative method of operation employed by the invention.

FIG. 7 is a flowchart diagram of an illustrative method of operation employed by the invention. The invention provides a method for integrating data representing a wind direction and a wind speed prevailing at at least a first geographic location into a television broadcast related to the first geographic location. In an illustrative embodiment of the invention, the method comprises the following steps. The wind direction and a wind speed prevailing at the first geographic location is sensed or sampled at 71. Respective signals representing the wind direction and the wind speed are generated. These respective signals representing the wind direction and the wind speed are transmitted at 72 and received at 73. A wind speed icon signal representing a wind speed icon corresponding to the wind speed signal is generated at 74, along with a wind direction icon signal representing a wind direction icon corresponding to the wind direction signal. An input television signal representing the television broadcast related to the first geographic location is received at 75. The input television signal is merged with the wind speed icon signal and the wind direction icon signal at 76 so that the wind speed icon and the wind direction icon are superimposed on the television broadcast related to the first geographic location.

In an illustrative embodiment of the invention, the method further comprises the following steps involved with operating at least a second monitoring station within the system. A further wind direction and a further wind speed prevailing are sensed at a further geographic location (at 71). Further respective signals representing the further wind direction and the further wind speed are generated, and these further respective signals representing the further wind direction and the further wind speed are transmitted to the base station (at 72). These further respective signals representing the further wind direction and the further wind speed are received at the base station (at 73). The base station generates (at 74) a further wind speed icon signal representing a further wind speed icon corresponding to the further wind speed signal, and a further wind direction icon signal representing a further wind direction icon corresponding to the further wind direction signal. The base station also receives (at 75) a further input television signal representing a further television broadcast related to a further geographic location. Finally, the base station merges (at 76) the further input television signal with the further wind speed icon signal and the further wind direction icon signal so that the further wind speed icon and the further wind direction icon are superimposed on the further television broadcast related to the further geographic location.

A test is performed at 77 to determine whether additional monitoring stations are to be sampled. If so, another monitoring station, in this illustrative embodiment, the second monitoring station, is sampled at 78 and the previously described steps (72, 73, 74, 75, 76) are repeated. If not, further samplings are taken from the first monitoring station and the previously described steps (72, 73, 74, 75, 76) are repeated.

It is understood that changes may be made to the illustrative embodiments described above without departing from the broad inventive concepts thereof. Accordingly, the present invention is not limited to the particular illustrative embodiments disclosed, but is intended to cover all modifications that are within the spirit and scope of the invention as defined by the appended claims.

I claim:

1. A system for integrating data representing weather parameters prevailing at a plurality of geographic locations into television broadcast signals originating from and related to the plurality of geographic locations, the system comprising:
   a portable monitoring station located at each of the plurality of geographic locations, the monitoring station including,
      means for sensing the weather parameters prevailing at each of the plurality of geographic locations, and for generating weather parameter signals representing the weather parameters, and
      means for transmitting the weather parameter signals from the monitoring station;
   a base station including,
      means for receiving the weather parameter signals from the monitoring station,
      means for generating icon signals representing weather parameter icons in response to the weather parameter signals, the weather parameter icons representing the weather parameters sensed at the plurality of geographic locations, and
      means for converting the icon signals into television signals representing the weather parameters, the television signals being in a format suitable for integration into the television broadcast signals;
   production switching means for receiving the television signals representing the weather parameters and the television broadcast signals, and for combining the television signals representing the weather parameters and the television broadcast signals so that first icon signals representing first weather parameter signals sensed at a first geographic location are combined with first television broadcast signals from the first geographic location, and so that second icon signals representing second weather parameter signals sensed at a second geographic location different from the first geographic location are combined with second television broadcast signals from the second geographic location; and
   means coupled with the production switching means for selecting an output television signal corresponding to either the first icon signals representing the first weather parameter signals sensed at the first geographic location combined with the first television broadcast signals from the first geographic location or the second icon signals representing the second weather parameter signals sensed at the second geographic location combined with the second television broadcast signals from the second geographic location.

2. The system of claim 1, wherein the television broadcast signals are live video signals including portions which can vary responsive to the weather parameters prevailing at the geographic locations.

3. The system of claim 1, wherein the sensing means includes means for sensing wind direction prevailing at the plurality of geographic locations and for generating wind direction signals representing the sensed wind direction, and means for sensing wind speed prevailing at the plurality of geographic locations and for generating wind speed signals representing the wind speed.

4. The system of claim 3, wherein the monitoring station includes a microcontroller coupled to receive the weather parameter signals from the sensing means, and wherein the transmitting means includes a wireless modem coupled to the microcontroller to transmit the wind direction signals and the wind speed signals from the monitoring station.

5. The system of claim 4, wherein the wireless modem is coupled with a cellular communications network.

6. The system of claim 4, wherein the wireless modem is coupled with a UHF radio communications network.

7. The system of claim 4, wherein the icon signal generating means is simultaneously responsive to the wind direction signals, to create a wind direction icon signal representing a wind direction icon, and to the wind speed signals, to create a wind speed icon signal representing a wind speed icon.

8. The system of claim 1, wherein the weather parameters prevailing at each of the plurality of geographic locations are continuously monitored for changes over time, so that changes in the weather parameters can be matched with changes in the television broadcast signals.

9. The system of claim 8, wherein the transmitting means is a shared transmitting means, having time-multiplexing means for establishing communications between the monitoring station and the base station.

10. The system of claim 9, which further includes means for periodically polling the monitoring station, for the continuous monitoring of the changes in the weather parameters over time.

11. The system of claim 8, wherein the weather parameters prevailing at each of the plurality of geographic locations are continuously monitored in real-time.

12. The system of claim 1, wherein the production switching means includes means for merging the icon signals with the television broadcast signals, the merging means producing the output television signal representing the weather parameter icons superimposed on the television broadcast signals.

13. The system of claim 12, which further includes means for generating an advertising icon signal representing an advertising icon including advertising indicia, and wherein the output television signal produced by the merging means includes an advertising icon merged with the weather parameter icons superimposed on the television broadcast signals.

14. The system of claim 1, wherein the monitoring station includes a microcontroller coupled to receive the weather parameter signals from the sensing means, and wherein the microcontroller includes means for sampling the weather parameter signals generated by the sensing means, and interrupt logic for servicing interrupts generated by the sampling means.

15. The system of claim 14, wherein the microcontroller further includes interrupt service routines for configuring the sampling means and to retrieve sampled data from the sampling means, and switch logic responsive to an operator and operatively coupled with the interrupt service routines for configuring and programming the microcontroller.

16. The system of claim 15, wherein the microcontroller further includes protocol interrupt logic for coordinating and executing series communication of the sampled data from the microcontroller to the base station.

17. The system of claim 14, wherein the base station includes multi-point serial communications protocol logic for coordinating and executing serial communications between the base station and the microcontroller of the monitoring station.

18. The system of claim 17, wherein the protocol logic is based on a poll-select protocol.

19. The system of claim 14, wherein the microcontroller further includes operator interface means coupled with the microcontroller.

20. The system of claim 19, wherein the operator interface means enables a selective display of status conditions of the monitoring station.

21. The system of claim 19, wherein the operator interface means enables selection of the monitoring station to be sampled.

22. The system of claim 21, wherein the operator interface means enables selection of a graphic for displaying data received from the monitoring station.

23. The system of claim 19, wherein the operator interface means includes at least one remote status window for the monitoring station coupled with the base station, for displaying status conditions and sampled data to an operator.

24. The system of claim 23, wherein the operator interface means further includes means for controlling the sampling and the display of the monitoring station, and means for setting graphic parameters and for controlling display of icons associated with the monitoring station.

25. The system of claim 24, which further includes graphics presenting and updating logic means coupled with the operator interface means, for combining operator inputs with the sampled data from the monitoring station, and for responsively displaying the graphics.

26. The system of claim 25, wherein the graphics presenting and updating logic means is coupled with protocol interrupt logic for coordinating and executing communication of the sampled data from the microcontroller to the base station, for refreshing the sampled data from the monitoring station, thereby providing an up-to-the-minute display of weather conditions for display with the television broadcast signals.

27. The system of claim 26, wherein the weather conditions and the television broadcast signals are continuously monitored and displayed in real-time.

28. A system for integrating data representing weather parameters prevailing at a plurality of geographic locations into television broadcast signals originating from and related to the plurality of geographic locations, the system comprising:
 a portable monitoring station located at each of the plurality of geographic locations, the monitoring station including,
  means for sensing the weather parameters prevailing at each of the plurality of geographic locations, and for generating weather parameter signals representing the weather parameters, and
  means for transmitting the weather parameter signals from the monitoring station; and
 a base station including,
  means for receiving the weather parameter signals from the monitoring station,
  means for generating icon signals representing weather parameter icons in response to the weather parameter signals, the weather parameter icons representing the weather parameters sensed at the plurality of geographic locations, and
  means for converting the icon signals into television signals representing the weather parameters, the television signals being in a format suitable for integration into the television broadcast signals;
 wherein the monitoring station includes a microcontroller coupled to receive the weather parameter signals from the sensing means, and wherein the microcontroller includes means for sampling the weather parameter signals generated by the sensing means, and interrupt logic for servicing interrupts generated by the sampling means.

29. The system of claim 28, wherein the microcontroller further includes interrupt service routines for configuring the sampling means and to retrieve sampled data from the sampling means, and switch logic responsive to an operator and operatively coupled with the interrupt service routines for configuring and programming the microcontroller.

30. The system of claim 29, wherein the microcontroller further includes protocol interrupt logic for coordinating and executing series communication of the sampled data from the microcontroller to the base station.

31. The system of claim 28, wherein the base station includes multi-point serial communications protocol logic for coordinating and executing serial communications between the base station and the microcontroller of the monitoring station.

32. The system of claim 31, wherein the protocol logic is based on a poll-select protocol.

33. The system of claim 28, wherein the microcontroller further includes operator interface means coupled with the microcontroller.

34. The system of claim 33, wherein the operator interface means enables a selective display of status conditions of the monitoring station.

35. The system of claim 33, wherein the operator interface means enables selection of the monitoring station to be sampled.

36. The system of claim 35, wherein the operator interface means enables selection of a graphic for displaying data received from the monitoring station.

37. The system of claim 33, wherein the operator interface means includes at least one remote status window for the monitoring station coupled with the base station, for displaying status conditions and sampled data to the operator.

38. The system of claim 37, wherein the operator interface means further includes means for controlling the sampling and the display of the monitoring station, and means for setting graphic parameters and for controlling display of icons associated with the monitoring station.

39. The system of claim 38, which further includes graphics presenting and updating logic means coupled with the operator interface means, for combining operator inputs with the sampled data from the monitoring station, and for responsively displaying the graphics.

40. The system of claim 39, wherein the graphics presenting and updating logic means is coupled with protocol interrupt logic for coordinating and executing communication of the sampled data from the microcontroller to the base station, for refreshing the sampled data from the monitoring station, thereby providing an up-to-the-minute display of weather conditions for display with the television broadcast signals.

41. The system of claim 40, wherein the weather conditions and the television broadcast signals are continuously monitored and displayed in real-time.

42. A method for integrating data representing weather parameters prevailing at a plurality of geographic locations into television broadcast signals originating from and related to the plurality of geographic locations, the method comprising the steps of:
- monitoring weather conditions at each of the plurality of geographic locations through portable monitoring means, the monitoring including sensing the weather parameters prevailing at each of the plurality of geographic locations, and generating weather parameter signals representing the weather parameters;
- transmitting the weather parameter signals from a monitoring station to a base station;
- generating icon signals representing weather parameter icons in response to the weather parameter signals, the weather parameter icons representing the weather parameters sensed at the plurality of geographic locations;
- converting the icon signals into television signals representing the weather parameters, the television signals being in a format suitable for integration into the television broadcast signals;
- receiving the television signals representing the weather parameters and the television broadcast signals in production switching means for combining the television signals representing the weather parameters and the television broadcast signals, wherein the combining includes a first combining of first icon signals representing first weather parameter signals sensed at a first geographic location with first television broadcast signals from the first geographic location, and a second combining of second icon signals representing second weather parameter signals sensed at a second geographic location different from the first geographic location with second television broadcast signals from the second geographic location; and
- selecting an output television signal corresponding to either the first icon signals representing the first weather parameter signals sensed at the first geographic location combined with the first television broadcast signals from the first geographic location or the second icon signals representing the second weather parameter signals sensed at the second geographic location combined with the second television broadcast signals from the second geographic location.

43. The method of claim 42, which further includes the step of providing, as the television broadcast signals, live video signals including portions which can vary responsive to the weather parameters prevailing at the geographic locations.

44. The method of claim 42, which further includes the steps of sensing wind direction prevailing at the plurality of geographic locations and generating wind direction signals representing the sensed wind direction, and sensing wind speed prevailing at the plurality of geographic locations and generating wind speed signals representing the wind speed.

45. The method of claim 42, which further includes the step of performing the transmitting step and the receiving step with wireless communications.

46. The method of claim 42, which further includes the steps of continuously monitoring the weather parameters prevailing at each of the plurality of geographic locations for changes over time, and matching changes in the weather parameters with changes in the television broadcast signals.

47. The method of claim 46, which further includes the step of periodically polling the monitoring station, for continuously monitoring the changes in the weather parameters over time.

48. The method of claim 47, wherein the weather parameters prevailing at each of the plurality of geographic locations are continuously monitored in real-time.

49. The method of claim 42, which further includes the steps of merging the icon signals with the television broadcast signals, and producing the output television signal representing the weather parameter as icons superimposed on the television broadcast signals.

50. The method of claim 49, which further includes the steps of generating an advertising icon signal representing an advertising icon including advertising indicia, and merging the advertising icon signal with the weather parameter icon signals and the television broadcast signals, superimposing the advertising icon and the weather parameter icons on the television broadcast signals.

51. The method of claim 42, which further includes the step of selectively displaying status conditions of the monitoring station responsive to an operator interface.

52. The method of claim 51, which further includes the step of selecting the monitoring station to be sampled.

53. The method of claim 52, which further includes the step of displaying a graphic for displaying data received from the monitoring station.

54. The method of claim 53, which further includes the step of displaying status conditions and sampled data associated with the monitoring station.

55. The method of claim 54, which further includes the steps of controlling the sampling and the display of the monitoring station, and setting graphic parameters and controlling display of icons associated with the monitoring station.

* * * * *